United States Patent
Ivanov et al.

(10) Patent No.: US 11,416,711 B2
(45) Date of Patent: Aug. 16, 2022

(54) DEFECT DETECTION SYSTEM

(71) Applicant: Nanotronics Imaging, Inc., Cuyahoga Falls, OH (US)

(72) Inventors: Tonislav Ivanov, Brooklyn, NY (US); Denis Babeshko, New York, NY (US); Vadim Pinskiy, Wayne, NJ (US); Matthew C. Putman, Brooklyn, NY (US); Andrew Sundstrom, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

(21) Appl. No.: 17/195,760

(22) Filed: Mar. 9, 2021

(65) Prior Publication Data

US 2021/0279520 A1    Sep. 9, 2021

Related U.S. Application Data

(60) Provisional application No. 62/987,002, filed on Mar. 9, 2020.

(51) Int. Cl.
*G06K 9/62* (2022.01)
*G06V 10/82* (2022.01)
(Continued)

(52) U.S. Cl.
CPC ......... *G06K 9/6257* (2013.01); *G06K 9/6254* (2013.01); *G06N 3/08* (2013.01);
(Continued)

(58) Field of Classification Search
None
See application file for complete search history.

(56) References Cited

U.S. PATENT DOCUMENTS

| | | |
|---|---|---|
| 2010/0088264 A1 | 4/2010 | Teverovskiy et al. |
| 2017/0177722 A1 | 6/2017 | Cavalin et al. |
| | (Continued) | |

FOREIGN PATENT DOCUMENTS

| | | |
|---|---|---|
| CN | 110475505 | 11/2019 |
| CN | 107368614 | 7/2020 |
| TW | 201917566 | 5/2019 |

OTHER PUBLICATIONS

L. Xu, S. Lv, Y. Deng and X. Li, "A Weakly Supervised Surface Defect Detection Based on Convolutional Neural Network," in IEEE Access, vol. 8, pp. 42285-42296, Mar. 2, 2020, doi: 10.1109/ACCESS.2020.2977821. (Year: 2020).*

(Continued)

*Primary Examiner* — Emily C Terrell
*Assistant Examiner* — Nathan J Bloom
(74) *Attorney, Agent, or Firm* — DLA Piper LLP (US)

(57) ABSTRACT

A computing system generates a training data set for training the prediction model to detect defects present in a target surface of a target specimen and training the prediction model to detect defects present in the target surface of the target specimen based on the training data set. The computing system generates the training data set by identifying a set of images for training the prediction model, the set of images comprising a first subset of images. A deep learning network generates a second subset of images for subsequent labelling based on the set of images comprising the first subset of images. The deep learning network generates a third subset of images for labelling based on the set of images comprising the first subset of images and the labeled second subset of images. The computing system continues the process until a threshold number of labeled images is generated.

14 Claims, 6 Drawing Sheets

(51) Int. Cl.
*G06N 3/08* (2006.01)
*G06N 20/20* (2019.01)
*G06V 30/19* (2022.01)
*G06V 10/70* (2022.01)
*G06V 10/774* (2022.01)
*G06V 10/778* (2022.01)
*G06V 10/94* (2022.01)

(52) U.S. Cl.
CPC ............. *G06N 20/20* (2019.01); *G06V 10/70* (2022.01); *G06V 10/7747* (2022.01); *G06V 10/7784* (2022.01); *G06V 10/7796* (2022.01); *G06V 10/82* (2022.01); *G06V 10/945* (2022.01); *G06V 30/19147* (2022.01); *G06V 30/19167* (2022.01); *G06V 2201/06* (2022.01)

(56) References Cited

U.S. PATENT DOCUMENTS

| | | | | |
|---|---|---|---|---|
| 2018/0121601 | A1 | 5/2018 | Hahm et al. | |
| 2018/0373980 | A1* | 12/2018 | Huval | G06K 9/6254 |
| 2020/0226422 | A1* | 7/2020 | Li | G06K 9/6256 |
| 2020/0226735 | A1* | 7/2020 | Peng | G06K 9/6284 |
| 2020/0226743 | A1* | 7/2020 | Savchenko | G01N 21/9501 |
| 2021/0073977 | A1* | 3/2021 | Carter | G06T 7/0012 |
| 2021/0142168 | A1* | 5/2021 | Kushnir | G06N 3/063 |

OTHER PUBLICATIONS

Feng C, Liu MY, Kao CC, Lee TY. Deep active learning for civil infrastructure defect detection and classification. InComputing in civil engineering 2017 Jun. 2017 (pp. 298-306). (Year: 2017).*

Koutroulis G, Santos T, Wiedemann M, Faistauer C, Kern R, Thalmann S. Enhanced Active Learning of Convolutional Neural Networks: A Case Study for Defect Classification in the Semiconductor Industry. InKDIR Nov. 2020 (pp. 269-276). (Year: 2020).*

Heo G, Roh Y, Hwang S, Lee D, Whang SE. Inspector gadget: A data programming-based labeling system for industrial images. arXiv preprint arXiv:2004.03264. Apr. 7, 2020. (Year: 2020).*

Lv, Xiaoming, Fajie Duan, Jia-Jia Jiang, Xiao Fu, and Lin Gan. Mar. 16, 2020. "Deep Active Learning for Surface Defect Detection" Sensors 20, No. 6: 1650. https://doi.org/10.3390/s20061650 (Year: 2020).*

Pead, et al., "Automated detection of age-related macular degeneration in color fundus photography: a systematic review," survey of ophthalmology 64.4, 2019, pp. 498-511.

PCT International Application No. PCT/US21/21449, International Search Report and Written Opinion of the International Searching Authority, dated May 25, 2021, 9 pages.

* cited by examiner

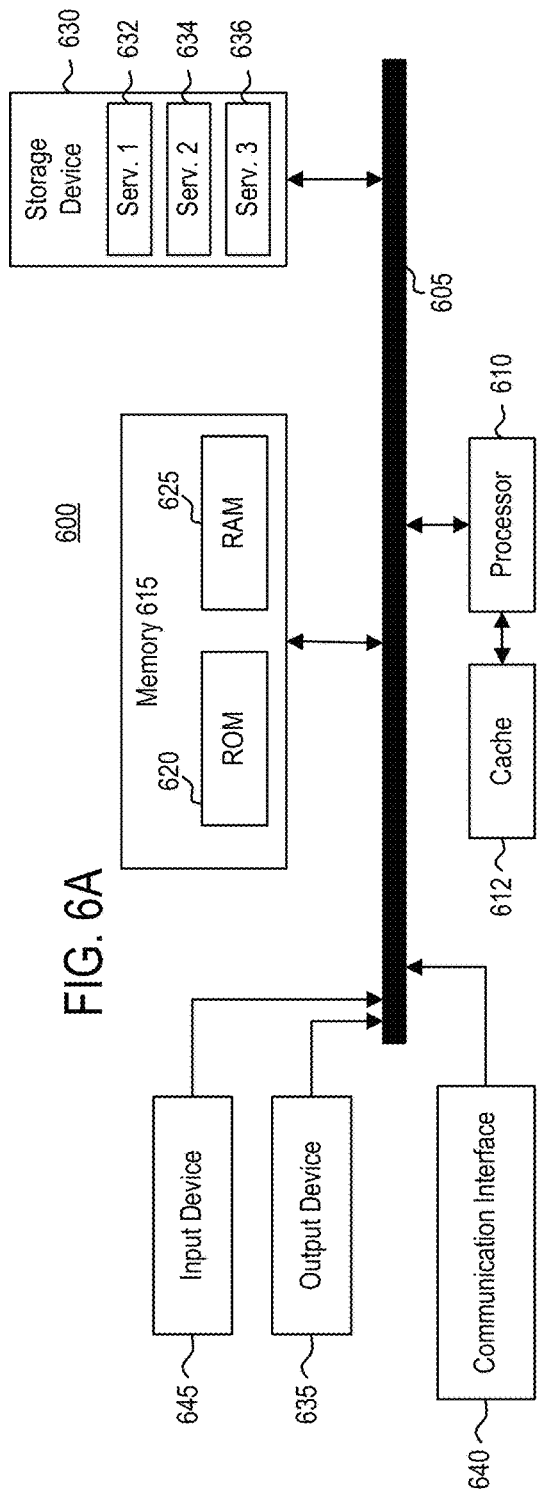
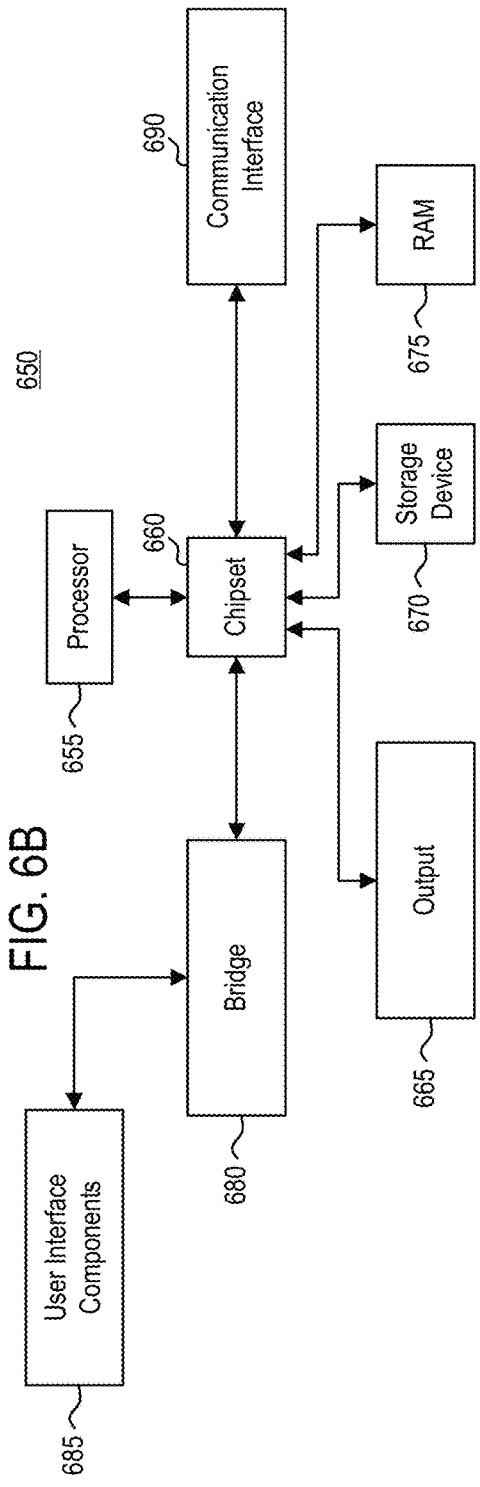

DEFECT DETECTION SYSTEM

CROSS-REFERENCE TO RELATED APPLICATIONS

This application claims priority to U.S. Provisional Application Ser. No. 62/987,002, filed Mar. 9, 2020, which is hereby incorporated by reference in its entirety.

FIELD OF DISCLOSURE

The present disclosure generally relates to a defect detection system.

BACKGROUND

Deep learning models have become popular in object detection tasks. These models require a large number of labeled data to be effectively trained. In many cases, collecting large amounts of data is not difficult, but manually labelling the data may be a very tedious and time-consuming process. Automatic labeling of data sets is increasing its applicability, but still lacks the precession necessary to replace human operators and often fairs poorly in cases with no prior historical examples.

SUMMARY

In some embodiments, a computing system is disclosed herein. The computing system include a processor and a memory. The memory has programming instructions stored thereon, which, when executed by the processor, performs operations. The operations include generating a training data set for training the prediction model to detect defects present in a target surface of a target specimen and training the prediction model to detect defects present in the target surface of the target specimen based on the training data set. The computing system generates the training data set by identifying a set of images for training the prediction model, the set of images comprising a first subset of images, wherein each image of the first subset of images is labeled with labels identifying defects on a respective specimen, generating, by a deep learning network, a second subset of images for subsequent labelling based on the set of images comprising the first subset of images, prompting an operator to label each image in the second subset of images, generating, by the deep learning network, a third subset of images for labelling based on the set of images comprising the first subset of images and the labeled second subset of images, prompting the operator to label each image in the third subset of images, and aggregating the first subset of images, the second subset of images, and the third subset of images, wherein each image in the first subset of images, the second subset of images, and the third subset of images are labeled.

In some embodiments, a method is disclosed herein. A computing system identifies a set of images for training a prediction model to detect defects in a surface of a specimen. The set of images includes a first subset of images. Each image of the first subset of images is labeled with labels identifying defects on a respective specimen. A deep learning network of the computing system generates a second subset of images for subsequent labelling based on the set of images comprising the first subset of image. The computing system prompts an operator to label each image in the second subset of images. The deep learning network generates a third subset of images for labelling based on the set of images comprising the first subset of images and the labeled second subset of images. The computing system prompts the operator to label each image in the third subset of images. The computing system aggregates the first subset of images, the second subset of images, and the third subset of images. Each image in the first subset of images, the second subset of images, and the third subset of images are labeled to form a training data set for training the prediction model.

In some embodiments, a computing system is disclosed herein. The computing system includes a processor and a memory. The memory has programming instructions stored thereon, which, when executed by the processor, performs operations. The operations include identifying a set of images for training a prediction model to detect defects in a surface of a specimen. The set of images includes a first subset of images. Each image of the first subset of images is labeled with labels identifying defects on a respective specimen. The operations further include generating, by a deep learning network of the computing system, a second subset of images for subsequent labelling based on the set of images comprising the first subset of images. The operations further include prompting an operator to label each image in the second subset of images. The operations further include generating, by the deep learning network, a third subset of images for labelling based on the set of images comprising the first subset of images and the labeled second subset of images. The operations further include prompting the operator to label each image in the third subset of images. The operations further include aggregating the first subset of images, the second subset of images, and the third subset of images. Each image in the first subset of images, the second subset of images, and the third subset of images are labeled to form a training data set for training the prediction model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6A illustrates a system bus computing system architecture, according to example embodiments.

FIG. 6B illustrates a computer system having a chipset architecture, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
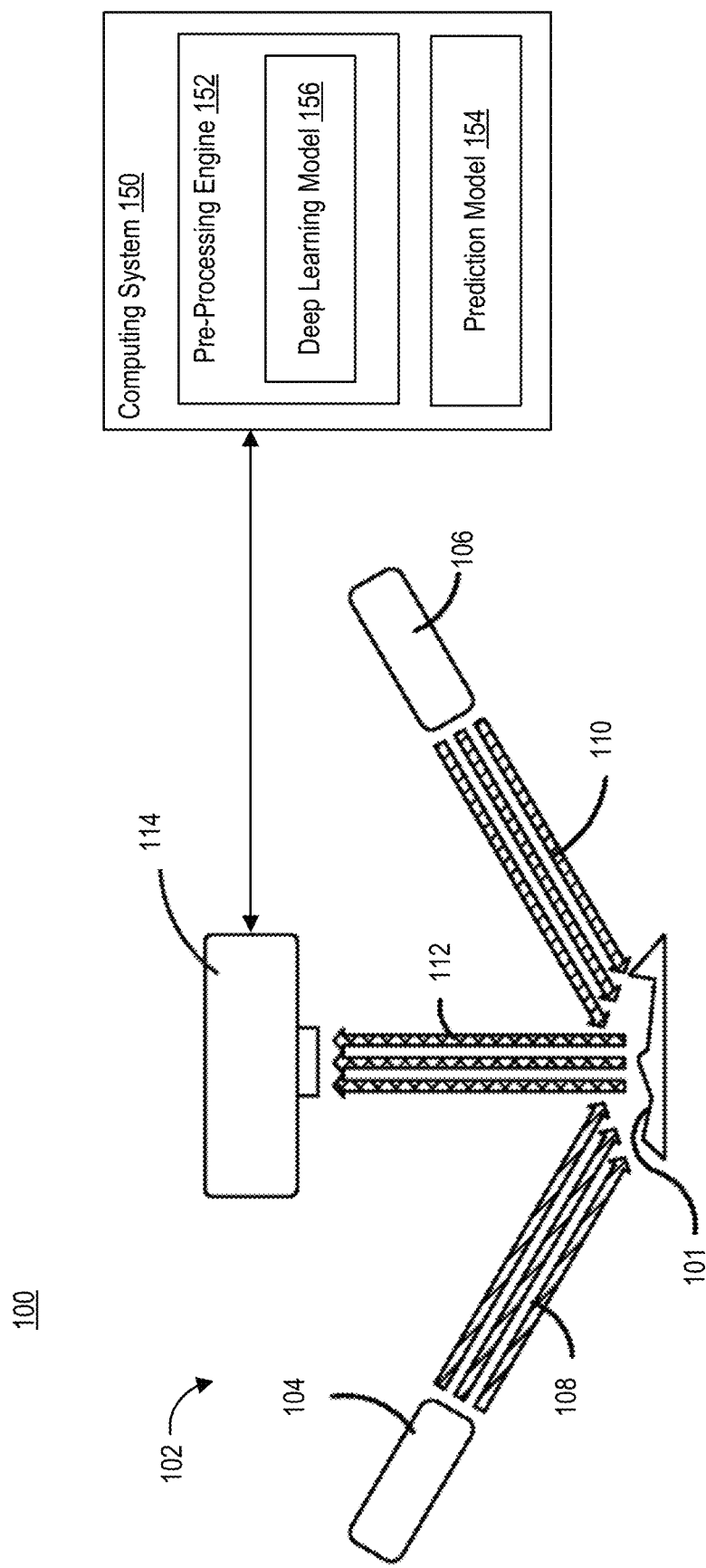
FIG. 1 is a block diagram illustrating a imaging system, according to example embodiments.

Training a machine learning model for object detection and classification that generalizes well may benefit from a diverse training data set. This training data set usually involves human annotation, where a person goes sequentially through a list of images, labelling a sufficiently high number of examples in each image until an imposed threshold is reached. This conventional process is time consuming and unnecessary, especially when many of similar examples may be repeated. For large data sets, labeling every example may be infeasible due to the intrinsic constraints of cost and time. For optimal processing, the underlying task is to prioritize images for human labeling based on contribution to the training of the deep learning algorithm.

Naively, most operators may sort and label images alphanumerically by the order that they may be saved or numbers in the hose directory. This may vary by collection and file system and may be rarely correlated to the acquired data. After a brief global examination and determination of underlying classes, the operator may proceed to label every image, sequentially, through the directory, in the allotted time. Much of the data may be excess repeats, lack the sensitivity needed, contain background irregularities, and other iterations that may make the labeled data ill-suited for optimal training. The feedback between the final trained model and the labelling may be typically informal. Commonly, the separation between labeler and data processing is so large, that the labeler receives no feedback as to the usefulness of the labeled data, or knowledge as to how to formally optimize the labeling process. Gross errors are usually reported, but those errors are easy to sort from the data and do not contribute negatively to the overall training model. Though an operator may be instructed to ignore or pass through certain examples, compliance may become an unsolved issue and difficult to track or effectively enforce, especially over very large groups and many labelers.

Operators may also form a habitual pattern and labeling and become very skilled at detecting certain classes, i.e., those with a high number of examples. This may create the illusion of efficiency, but instead propagates bias away from rare classes and those objects that are difficult to identify and categorize. Operators may be more likely to ignore rare examples as background than label them as defects, when subjected to repetitive exposure to a common class for many images. For certain architectures, such as deep learning architectures, this presents an extremely large problem as areas that are not classified into a labeled class are treated as background and cause the model to not detect those types of defects. Combating this problem through several labelers or a voting process can be implemented, but is costly and is not guaranteed to yield a huge improvement in results.

One or more techniques provided herein present a multi-staged approach that may be used to improve upon conventional processes by continuously updating an order of the images in the dataset to be manually labeled in order to maximize the uniqueness and diversity of the labels. In some embodiments, the multi-staged approach may employ a deep learning segmentation model configured to predict the areas in an image of previously unseen data. In some embodiments, the multi-staged approach may focus on data sets where the objects may be distributed randomly, may vary in morphology within class, and may appear in small or large numbers per class. For these data sets, the present approach can achieve high accuracy model labelling.

Further, one or more techniques provided herein provide an improvement over conventional automatic labeling techniques. For example, using conventional approaches, a conventional system would run a model trained on previous data to generate labels and bounding boxes on the desired data set. The labeler would simply modify the bounding boxes. In the semiconductor domain and similar proprietary material domains, conventional automatic labeling approaches fail for lack of exposure to historical data and access to material specific classes that are the subject of the inspection and classification task. To address this, one or more techniques provided herein prompt a user or operator to label a small subset of images and define the class focus for the overall classification task. The goal is not to enforce an industry wide, or multi-user class restriction; but rather, to focus manual labeling on the key influencers. The model implemented by the present system may provide a hierarchical ordered list of the operator to label. In some embodiments, the model may be trained in an active learning fashion. For example, the model may be trained on a small initial data set and then may use the model to assist labeling the next batch of data, and then may retrain the model including the new data.

Still further, unlike conventional approaches, one or more technique described herein may utilize a curated training data set that includes more rare class examples. This curated training data set may help the model achieve better class balance in the training data set.

FIG. 1 illustrates an exemplary computing environment 100 for inspection of a specimen supported on a stage, according to exemplary embodiments. As shown, computing environment 100 may include an apparatus 102 in communication with a computing system 150, according to example embodiments. Apparatus 102 may be configured to illuminate a specimen 101 with one or more light sources 104, 106. One or more light sources 104, 106 may be configured to direct oblique light 108, 110 toward specimen 101 at an angle. The oblique illumination may be reflected from a surface of specimen 101 as reflected light 112. Apparatus 102 may include a camera device 114 having an image sensor that is configured to capture the reflected light. In some embodiments, light sources 104, 106 may be moved to different positions located circumferentially around the object, with images taken at each position.

In some embodiments, apparatus 102 may provide the images captured by camera device 114 to computing system 150 for processing. Computing system 150 may be in communication with apparatus 102 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Computing system 150 may be configured to analyze the images captured by camera device 114 and generate a topography of specimen 101.

As shown, computing system 150 may include a pre-processing engine 152 and a prediction model 154. Each of pre-processing engine 152 and prediction model 154 may include one or more software modules. The one or more software modules may be collections of code or instructions stored on a media (e.g., memory of computing system 150) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Pre-processing engine 152 may be configured to generate one or more training data sets to train prediction model 154. As provided above, it is often a tedious task for users to manually label and develop training sets for training prediction model 154. Pre-processing engine 152 may include deep learning model 156. Deep learning model 156 may be trained to sort images for labeling. In some embodiments, deep learning model 156 may be trained on an initial small subset of images. All objects of interest in the initial small subset of images may be labeled with rectangular bounding boxes. In some embodiments, the pixels inside of the bounding boxes of all labeled objects may be grouped into a first category (e.g., "foreground"); the rest of the image pixels may be grouped into a second category (e.g., "background"). Using this classification, two input segmentation masks may be generated: a first input segmentation mask for the background and a second input segmentation mask for the foreground. In some embodiments, bounding boxes around the foreground objects may be enlarged to eliminate or reduce ambiguity of classifying pixels on the border of the bounding boxes.

In some embodiments, deep learning model 156 may be trained to produce two probability maps: a first probability map providing the probability of each pixel belonging to the foreground; and a second probability map providing the probability of each pixel belonging to the background. In some embodiments, the size of each probability map may be the same size as the input image. Using the first probability map and the second probability map, pre-processing engine 152 may compute a measure that a pixel has not been seen, e.g., $S_{unseen}$. Pixels that may belong to examples of a new class not yet labeled or to novel-looking examples of a previously labeled class will have a high unseen score. For example:

$$S_{unseen}(x,y)=1-P((x,y)\in bg)-P((x,y)\in fg)$$

Using the per-pixel unseen scores, pre-processing engine may compute an overall image metric and used for raking images. In some embodiments, a high image metric may correspond to a high confidence that the image contains a pixel that has not been seen and therefore deserves labeling priority. In some embodiments, it may be unclear which image should have higher priority: an image that has few high scoring pixels or an image that has plenty of low scoring pixels. To account for this, in some embodiments, pre-processing engine 118 may compute two metrics: a threshold metric $M_{thresh}$ and an alpha metric $M_{alpha}$. In some embodiments, threshold metric may be equal to a number of pixels that have an unseen score above some threshold. Under the threshold metric, low scoring pixels may have no influence on the metric. For example:

$$M_{thresh} = \sum_{(x,y)} S_{unseen}(x, y) > t$$

In some embodiments, alpha metric may be equal to the sum of all unseen scores at power, α. Under alpha metric, all pixels may be accounted for but lower scoring pixels have a lesser influence on the score.

$$M_{alpha} = \sum_{(x,y)} S_{unseen}(x, y)^{\alpha}$$

After the images are ranked using one of these metrics, the next batch of images to be labeled may be produced. This process may iterate in an active learning fashion: the new images are labeled and deep learning model 156 may be re-trained using the newly available labeled images, and deep learning model 156 may be invoked to produce the next batch of images to be labeled.

After a sufficient amount of data is labeled, prediction model 154 may be trained to detect defects in specimens. In some embodiments, prediction model 154 may also be used to automatically label the rest of the dataset.

Figure 2:
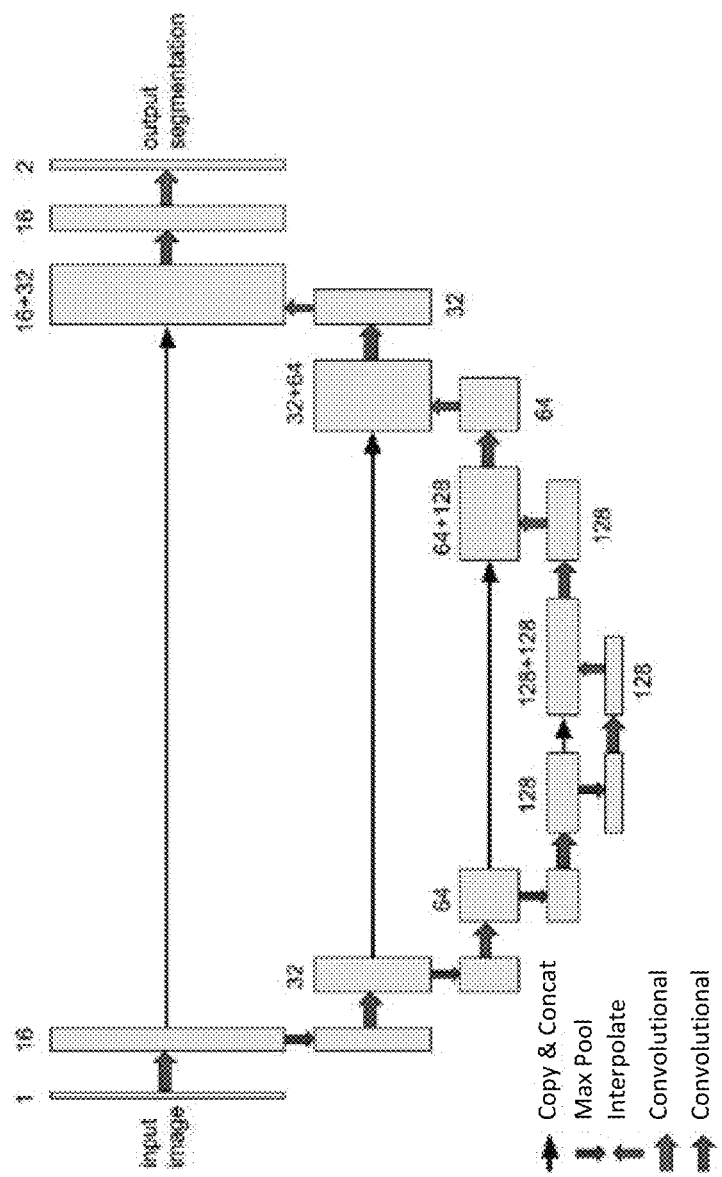
FIG. 2 illustrates an architecture of deep learning model, according to example embodiments.

FIG. 2 illustrates an architecture 200 of deep learning model 156, according to example embodiments. As shown, architecture 200 may be based off the U-net architecture. Architecture 200 is a modified U-net architecture that removes the final softmax layer that produces the segmentation masks in order to directly obtain the pixel probabilities per class. Architecture 200 also includes a different set of convolutional layer padding to match the input size and the number of feature maps used by the convolutional layers.

Figure 3:
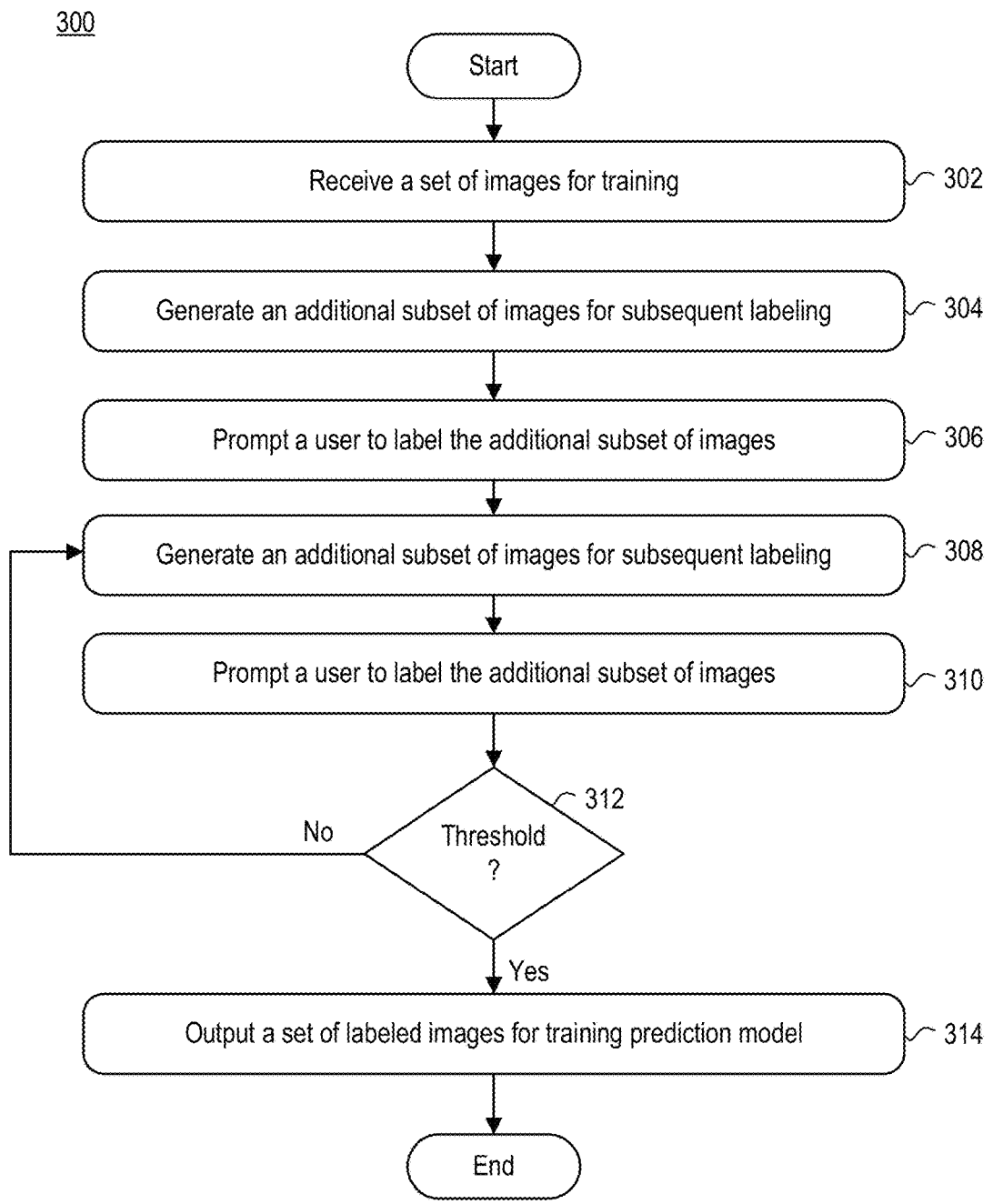
FIG. 3 is a flow diagram illustrating a method of generating a training data set to train prediction model, according to example embodiments.

FIG. 3 is a flow diagram illustrating a method 300 of generating a training data set to train prediction model 154, according to example embodiments. Method 300 may begin at step 302.

At step 302, computing system 150 may receive a set of images for training prediction model 154. In some embodiments, computing system 150 may receive a set of images from a client device in communication with computing system 150. In some embodiments, computing system 150 may receive a set of images from a database associated with computing system 150. In some embodiments, computing system 150 may receive a set of images from a third party website or system. In some embodiments, the set of images may include a subset of labeled images. The subset of labeled images may be labeled by a person or operator. The subset of labeled images may include labels for all defects present in the image. In some embodiments, random selection was not chosen to prevent any selection bias by the operator and to force alphanumeric bias, as would be performed by an operator under the conventional paradigm.

At step 304, computing system 150 may generate a second subset of images for subsequent labeling. For example, computing system 150 may provide the set of images to deep learning model 156 for processing. The set of images may include the subset of labeled images, along with the rest of the unlabeled images. Deep learning model 156 may generate two probability maps for each image: a first probability map providing the probability of each pixel belonging to the foreground; and a second probability map providing the probability of each pixel belonging to the background. Using the first probability map and the second probability map, pre-processing engine 152 may compute the $S_{unseen}$ metric. Based on the $S_{unseen}$ metric, pre-processing engine 152 may generate the $M_{alpha}$ metric for each image. Once pre-processing engine 152 generate each $M_{alpha}$ metric, pre-processing engine 152 may rank the images and select a set of highest scoring images to form the second subset of images.

At step 306, computing system 150 may prompt a user to label the second subset of images. For example, computing system 150 may prompt a user to label all defects contained in the second subset of images. Because deep learning model 156 was able to identify a second subset of images that include pixels unseen compared to the subset of labeled images from the original set of images, deep learning model 156 has identified additional images that may be useful for subsequent training of prediction model 154.

At step 308, computing system 150 may generate a third subset of images for subsequent labeling. For example, computing system 150 may provide the set of images to deep learning model 156 for continual training. The set of images may include the subset of labeled images, the second subset of images (that are now also labeled), and the remaining unlabeled images. Deep learning model 156 may generate two probability maps for each image: a first probability map providing the probability of each pixel belonging to the foreground; and a second probability map providing the probability of each pixel belonging to the background. Using the first probability map and the second probability map, pre-processing engine 152 may compute the $S_{unseen}$ metric. Based on the $S_{unseen}$ metric, pre-processing engine 152 may generate the $M_{alpha}$ metric for each image. Once pre-processing engine 152 generate each $M_{alpha}$ metric, pre-processing engine 152 may rank the images and select a set of highest scoring images to form the third subset of images.

At step 310, computing system 150 may prompt a user to label the third subset of images. For example, computing system 150 may prompt a user to label all defects contained in the third subset of images. Because deep learning model 156 was able to identify a third subset of images that include pixels unseen compared to the subset of labeled images from the original set of images and the second subset of images, deep learning model 156 has identified additional images that may be useful for subsequent training of prediction model 154.

At step 312, computing system 150 may determine if there are a threshold number of labeled images for training prediction model 154 as specified by $M_{thresh}$. For example, based on steps 304-310, computing system 150 may determine whether there are sufficient labeled images for training prediction model 154. If, at step 312, computing system 150 determines that there is not a threshold number of labeled images, then method 300 may revert to step 308 for continuing generation of image labels. In other words, if there are not a threshold amount of labeled images, computing system 150 may continue the process of providing a subset of labeled images, the second subset of labeled images, the third subset of labeled images, the nth subset of labeled images, and the remaining unlabeled images to deep learning model 156 for continued ranking of new unlabeled images for labeling.

If, however, at step 312, computing system 150 determines that there is a threshold amount of labeled images, then method 300 may proceed to step 314. At step 314, computing system 150 may output a set of labeled images for training prediction model 154.

Figure 4:
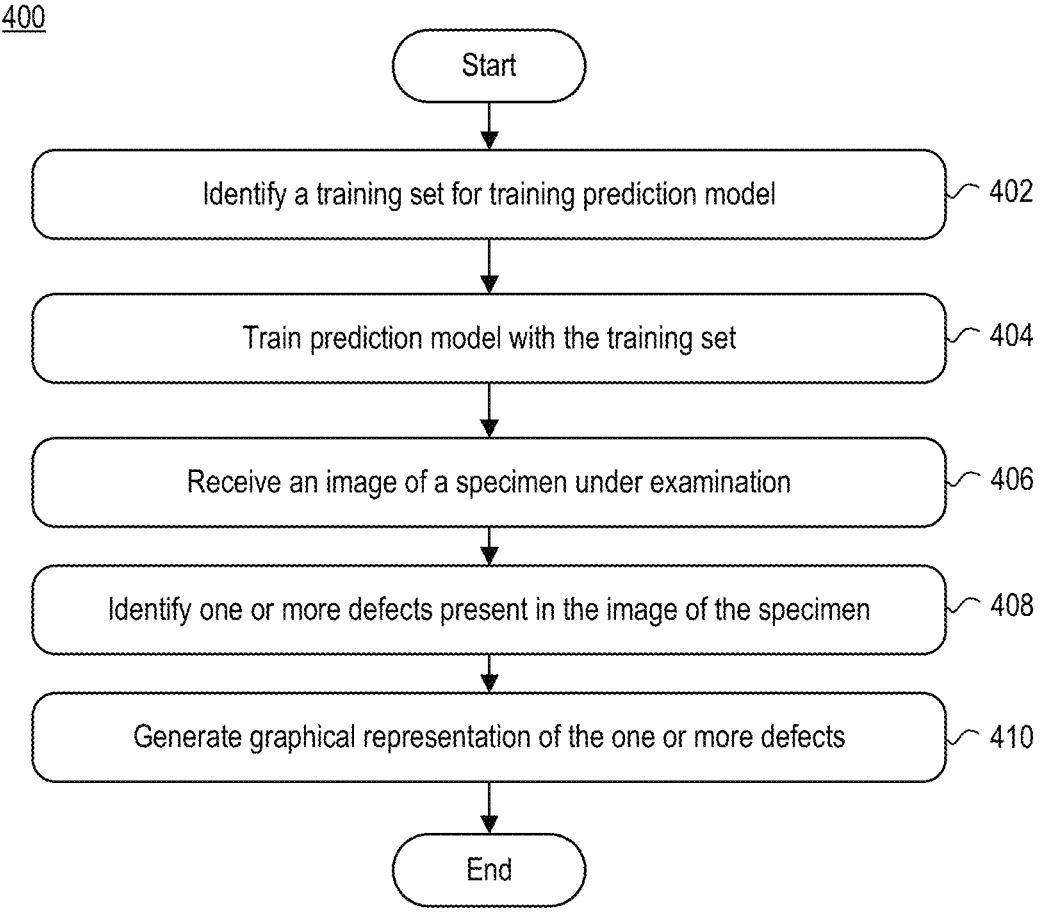
FIG. 4 is a flow diagram illustrating a method of identifying defects in a specimen, according to example embodiments.

FIG. 4 is a flow diagram illustrating a method 400 of identifying defects in a specimen, according to example embodiments. Method 400 may begin at step 402.

At step 402, computing system 150 may identify a training set for training prediction model 154 to identify defects present in a specimen. The training set may be representative of the set of labeled images generated by deep learning model 156. For example, the training set may include a plurality of images of various specimens, each image including one or more artifacts labels.

At step 404, computing system 150 may train prediction model 154. For example, computing system 150 may train prediction model 154 to identify defects in an image of a specimen based on the training set. In some embodiments, prediction model 154 may be representative of a faster region based convolutional neural network (R-CNN). Prediction model 154 may be trained on sequentially labeled images up to the time it took to label the algorithmically selected images (i.e., the same number of bounding boxes labeled).

At step 406, computing system 150 may receive, from apparatus 102, an image of a specimen under examination. In some embodiments, the specimen under examination may be a semiconductor substrate that may or may not contain one or more defects. Although the discussion references semiconductor substrates as one particular example, those skilled in the art recognize that the techniques disclosed herein are not limited to semiconductor substrates. For example, the techniques disclosed herein may be extended to detection features or defects/anomalies in biological tissue.

At step 408, computing system 150 may identify one or more defects present in the image of the specimen. For example, computing system 150 may provide the image, as input, to fully trained prediction model 154. Prediction model 154 may analyze the image to identify one or more defects present in the image of the specimen. In some embodiments, prediction model 154 may identify one or more defects present in the image by generating bounding boxes around each defect. In some embodiments, prediction model 154 may identify one or more defects present in the image by generating a probability map associated with the device.

At step 410, computing system 150 may generate a graphical representation of the one or more defects present in the image of the specimen. In some embodiments, prediction model 154 may generate a graphical representation that overlays one or more bounding boxes over each of the identified one or more defects in the image. In some embodiments, prediction model 154 may generate a graphical representation that overlays a heatmap over the image. The heat map may include verifying intensity based on where the defects are present. For example, areas of the image where defects are present will have a higher intensity that areas of the image where defects are not present.

Figure 5:
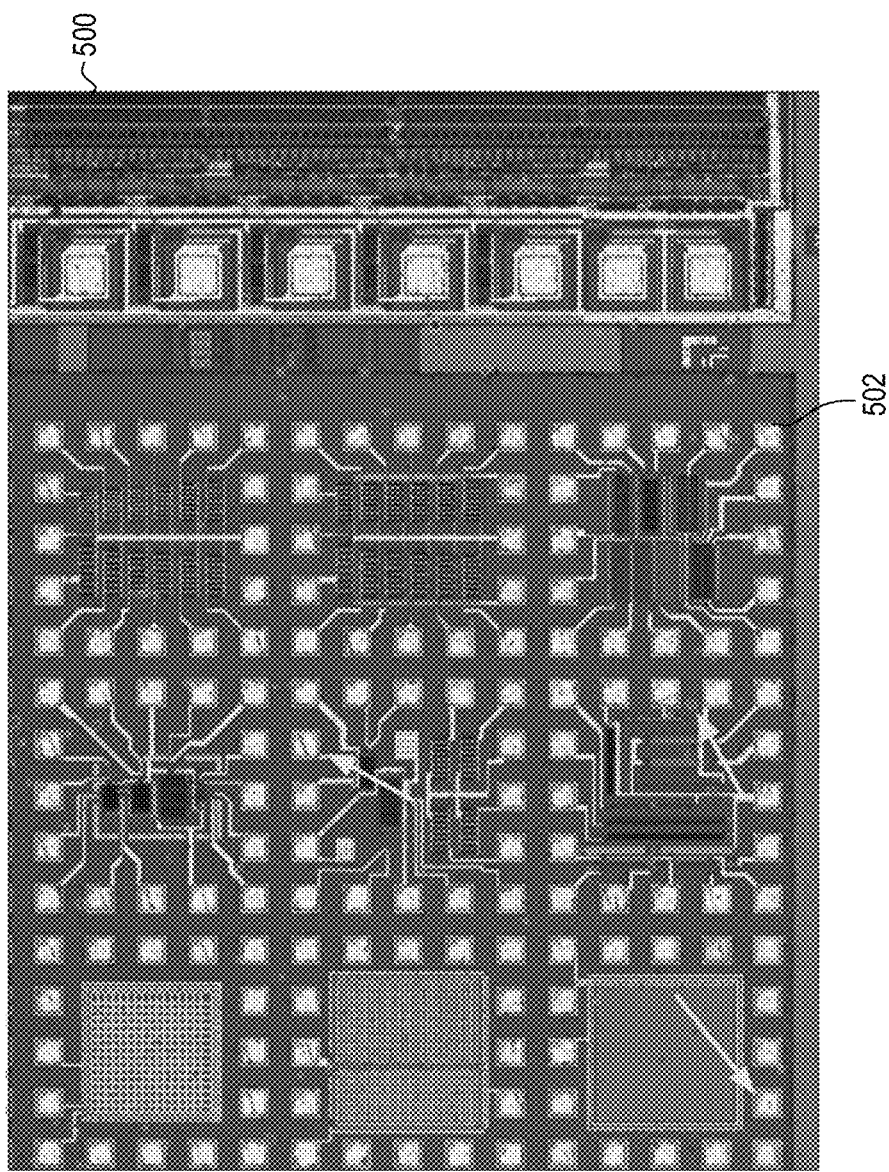
FIG. 5 illustrates an exemplary graphical output generated by prediction model, according to example embodiments.

FIG. 5 illustrates an exemplary graphical output 500 generated by prediction model 154, according to example embodiments. As shown, graphical output 500 may correspond to a probability map 502 generated by prediction model 154. Probability map 502 may be overlaid on the image of the specimen. The higher intensity areas of probability map 502 may indicate a high probability that defects are present in that location.

FIG. 6A illustrates a system bus computing system architecture 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 3 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing device 600, an input device 645 which can be any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with computing device 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, display 635, and so forth, to carry out the function.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computing system comprising:
a processor; and
a memory having programming instructions stored thereon, which, when executed by the processor, performs operations comprising:
generating a training data set for training a prediction model to detect defects present in a target surface of a target specimen by:

identifying a set of images for training the prediction model, the set of images comprising a first subset of images, wherein each image of the first subset of images is labeled with labels identifying defects on a respective specimen;
generating, by a deep learning network, a second subset of images for subsequent labelling based on the set of images comprising the first subset of images, the generating comprising:
for each image in the set of images, generating a first probability map corresponding to a first probability of each pixel in the image belongs to a first category,
for each image in the set of images, generating a second probability map corresponding to a second probability of each pixel in the image belongs to a second category, and
for each image in the set of images, generating an unseen metric based on the first probability map and the second probability map, wherein the unseen metric corresponds to a likelihood of the image including pixels unseen by the deep learning network;
prompting an operator to label each image in the second subset of images;
generating, by the deep learning network, a third subset of images for labelling based on the set of images comprising the first subset of images and the labeled second subset of images;
prompting the operator to label each image in the third subset of images; and
aggregating the first subset of images, the second subset of images, and the third subset of images, wherein each image in the first subset of images, the second subset of images, and the third subset of images are labeled; and
training the prediction model to detect defects present in the target surface of the target specimen based on the training data set.

2. The computing system of claim 1, wherein the unseen metric for the image is based on an aggregate of unseen metrics for each pixel in the image.

3. The computing system of claim 2, further comprising:
generating an alpha metric for the image based a corresponding unseen metric.

4. The computing system of claim 2, further comprising:
generating a threshold metric for the image based on a number of pixels in the image having an unseen score that exceeds a threshold value.

5. The computing system of claim 1, further comprising:
receiving, by the computing system from an imaging apparatus, a target image of the target surface of the target specimen;
detecting, by the prediction model, one or more defects present in the target surface of the target specimen; and
based on the detecting, generating, by the computing system, a graphical output illustrating the one or more defects.

6. A method, comprising:
identifying, by a computing system, a set of images for training a prediction model to detect defects in a surface of a specimen, the set of images comprising a first subset of images, wherein each image of the first subset of images is labeled with labels identifying defects on a respective specimen;
generating, by a deep learning network of the computing system, a second subset of images for subsequent labelling based on the set of images comprising the first subset of images, the generating comprising:
for each image in the set of images, generating a first probability map corresponding to a first probability of each pixel in the image belongs to a first category,
for each image in the set of images, generating a second probability map corresponding to a second probability of each pixel in the image belongs to a second category, and
for each image in the set of images, generating an unseen metric based on the first probability map and the second probability map, wherein the unseen metric corresponds to a likelihood of the image including pixels unseen by the deep learning network;
prompting, by the computing system, an operator to label each image in the second subset of images;
generating, by the deep learning network, a third subset of images for labelling based on the set of images comprising the first subset of images and the labeled second subset of images;
prompting, by the computing system, the operator to label each image in the third subset of images; and
aggregating, by the computing system, the first subset of images, the second subset of images, and the third subset of images, wherein each image in the first subset of images, the second subset of images, and the third subset of images are labeled to form a training data set for training the prediction model.

7. The method of claim 6, wherein the unseen metric for the image is based on an aggregate of unseen metrics for each pixel in the image.

8. The method of claim 7, further comprising:
generating an alpha metric for the image based a corresponding unseen metric.

9. The method of claim 7, further comprising:
generating a threshold metric for the image based on a number of pixels in the image having an unseen score that exceeds a threshold value.

10. The method of claim 6, further comprising:
training the prediction model to detect target defects in a target image based on the training data set.

11. A computing system, comprising:
a processor; and
a memory having programming instructions stored thereon, which, when executed by the processor, causes the computing system to perform operations comprising:
identifying a set of images for training a prediction model to detect defects in a surface of a specimen, the set of images comprising a first subset of images, wherein each image of the first subset of images is labeled with labels identifying defects on a respective specimen;
generating, by a deep learning network of the computing system, a second subset of images for subsequent labelling based on the set of images comprising the first subset of images, the generating comprising:
for each image in the set of images, generating a first probability map corresponding to a first probability of each pixel in the image belongs to a first category,
for each image in the set of images, generating a second probability map corresponding to a second probability of each pixel in the image belongs to a second category, and
for each image in the set of images, generating an unseen metric based on the first probability map and the second probability map, wherein the unseen metric corresponds to a likelihood of the image including pixels unseen by the deep learning network;

prompting an operator to label each image in the second subset of images;

generating, by the deep learning network, a third subset of images for labelling based on the set of images comprising the first subset of images and the labeled second subset of images;

prompting the operator to label each image in the third subset of images; and aggregating the first subset of images, the second subset of images, and the third subset of images, wherein each image in the first subset of images, the second subset of images, and the third subset of images are labeled to form a training data set for training the prediction model.

12. The computing system of claim 11, wherein the unseen metric for the image is based on an aggregate of unseen metrics for each pixel in the image.

13. The computing system of claim 12, further comprising:

generating an alpha metric for the image based a corresponding unseen metric.

14. The computing system of claim 12, further comprising:

generating a threshold metric for the image based on a number of pixels in the image having an unseen score that exceeds a threshold value.

* * * * *